Dec. 23, 1952  F. AUGHTIE  2,622,798
ELECTRICAL COMPUTING DEVICE
Filed Aug. 20, 1948
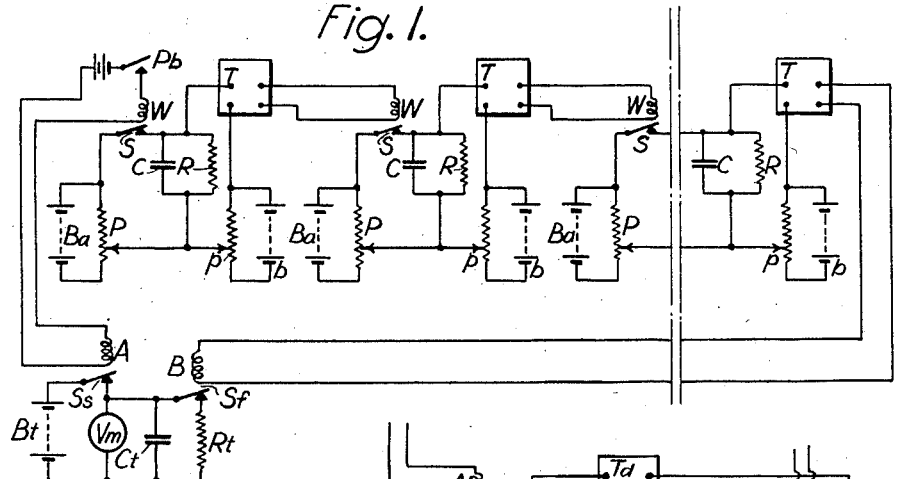
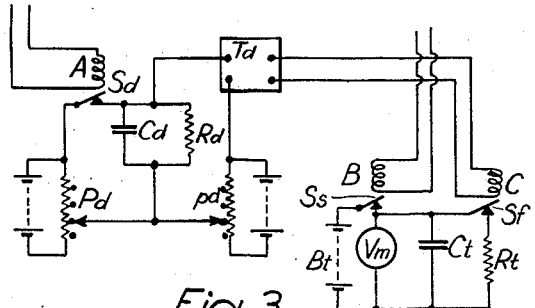
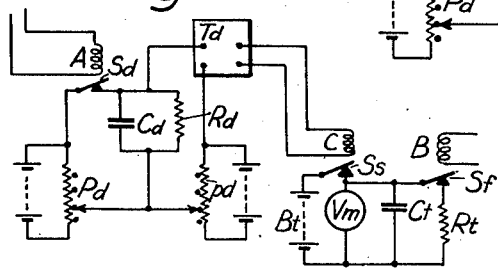
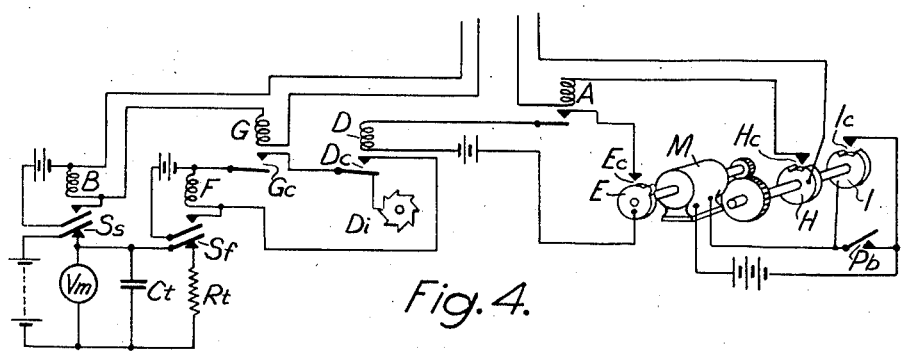
INVENTOR
Frank Aughtie
BY *A. E. Odell*
ATTORNEY Patented Dec. 23, 1952

2,622,798

UNITED STATES PATENT OFFICE 2,622,798

ELECTRICAL COMPUTING DEVICE

Frank Aughtie, Teddington, England

Application August 20, 1948, Serial No. 45,269
In Great Britain August 25, 1947

14 Claims. (Cl. 235—61)

Electrical circuits and methods are known whereby quantities may be added, subtracted, multiplied and divided and while these can be developed to provide powers and roots of low order they will not provide fractional or general powers and they are further limited in that they are unsuitable and inaccurate if the final result lies outside certain fairly limited ranges.

The present invention contemplates an electrical method of computation in which powers and products are obtained by taking logarithms and the final conversion back is, or can be done in such a manner that the significant figures and the position of the decimal point are separately provided. Normally, both the input data and output, or answer, are in the form of voltages or currents so that products or powers can be summed and the resulting sum be subjected to further operations if required.

Electrical computation by taking logarithms is not itself new, but the methods hitherto used have depended either upon graded resistance cards or on the special characteristics of some device such as a thermionic valve and are therefore empirical.

The present invention is based on the contrary on the fact that in an electric circuit including a reactive element and a resistance suitably associated therewith, in changing from one condition to another, electrical quantities in the circuit elements vary exponentially with time (i. e. according to an inverse logarithmic function), in other words the invention is based upon an absolute and inherent property of the circuit and the exponential variation is therefore exact and not approximate.

There are several possibilities in arranging and operating the circuit. Thus if a charged capacitance is allowed to discharge through a resistance shunting it, the voltage across the capacitance decays exponentially with time. Similarly if a steady current from an external source is flowing through the combination of an inductance and resistance in parallel, and the supply is suddenly interrupted, the current flowing in the inductance will decay exponentially with time. Corresponding exponential growths with time can be obtained by the use of circuits containing negative elements but these have a strictly limited range and would only be useful for the purposes of the invention in a very limited range of cases; of the two above mentioned arrangements giving exponential decay, a decaying voltage as obtained by discharging a condenser will usually be the more convenient.

The essential minimum apparatus according to one form of the invention comprises a circuit incorporating an element as above specified, and means which determines the time interval between the occurrence of two chosen values of the electrical quantity.

Some circuits which may be used in practising the invention are shown by way of example in the accompanying drawings. For convenience all of them employ a capacitance as the reactive element and therefore use voltage as the electrical quality but the changes necessary to use an inductance and current will be well understood by those skilled in the art.

Fig. 1 is a diagram of a circuit by which the product can be evaluated either as a logarithm or as the product itself.

Fig. 2 is a detail modification of Figure 1.

Figs. 3 and 4 are details of other modifications.

In all the figures like references indicate corresponding parts.

Taking now for convenience the case of a capacitance of value C, charged initially to a voltage V and discharged through a resistance R for a time $t$, until its voltage is then as is well known $$v = V e^{-\left(\frac{t}{CR}\right)}$$

whence $$V/v = e^{\frac{t}{CR}}$$

or $$t = CR \log_e (V/v)$$

i. e. the time $t$ is CR times the logarithm to the base $e$ of the ratio $V/v$. Further if it is desired to consider a single quantity, one of the voltages, conveniently $v$, can be made unity, in which case $t = \log V$.

The operation may conveniently be carried out by maintaining the voltage on the condenser at the higher chosen value and at a convenient instant starting the discharge and determining the time interval lapsing from the instant.

In general, extracting a logarithm is merely a step towards a further operation such as the (algebraic) summation of a number of logarithms to obtain a product, a quotient or in general the result of both multiplication and division. To effect such an operation a plurality of circuits as above described may be assembled, the completion of the discharge in one of them to the lower chosen voltage associated with that circuit initiating the discharge of the next, and so on in succession, a single timing means determining the total interval of the sequence of discharges. If the capacitance-resistance combination in each circuit has the same time constant, the total time will be in the same scale the logarithm of the product of the ratios, but by suitably choosing the time constants, the total time interval can be made the logarithm of the product of predetermined powers of the several ratios.

One possible form of circuit for summing time intervals as above described is shown in Fig. 1 of the accompanying drawings.

Each circuit comprises a capacitance-resistance combination CR one end of which is connected to one input terminal of a trigger element T, and the other end of which is connected to a potentiometer $p$ connected to a battery $b$ and to the other input terminal of the element T whereby the voltage $v$ can be applied to the combination. The essential feature of the trigger element which may for example be a thyratron is that when the voltage across CR falls to the value $v$ a current commences to flow in its output circuit. The other voltage V derived for example from a battery potentiometer combination BaP is normally applied across CR, but the supply can be broken by a contact S operable by a coil W. The coil W of the first circuit is in series with another coil A and both can be excited from a suitable supply controlled by a manual switch Pb which may be for instance a push button. The coils W controlling the contacts S of the subsequent circuits are in the output circuits of the preceding trigger elements T, while the output circuit of the last element includes a coil B. Excitation of the coil A starts a timing device and excitation of the coil B stops it. The timing device indicated comprises a capacitance and resistance combination $Ct$, $Rt$ across which a standard voltage is maintained derived for example from battery $Bt$, and an electrostatic voltmeter $Vm$ (calibrated in time); excitation of the coil A opens the supply (which then remains open) at the switch $Ss$ and excitation of the coil B disconnects the resistance $Rt$.

The chosen voltages $v$ and V appropriate to each circuit are first set up and the switch P is closed. This simultaneously excites the first coil W and the coil A. The former starts the discharge of the first condenser C and simultaneously the coil A starts the timing device. When the voltage across the first condenser C drops to the respective value $v$, the first trigger device operates so exciting the second coil W and starting the discharge of the second condenser C and so on until the last trigger device operates, exciting coil B and stopping the discharge of condenser $Ct$, leaving the voltmeter $Vm$ indicating the total time of the sequence of operations. Whether this is the logarithm of the straight product of the several ratios $V/v$ or of powers will depend as above explained on whether the time constants of the several CR combinations are equal or unequal. Also in terms of suitable values, either $v$ or V can be a suitable constant (such as unity or a power of 10) in any or all of the circuits.

It will be understood that the equipment can include any desired number of CR combinations and associated trigger devices.

The invention is also capable of the inverse process i. e. of evaluating the antilogarithm from a time interval representing a logarithm. For this purpose in the simplest form and again assuming discharge of an initially charged condenser through a resistance, the discharge is continued for the time interval and the voltage at the end of this interval is a measure of the antilogarithm of the given time-interval.

The timing circuit $CtRt$ in Figure 1 can serve this purpose if the voltmeter $Vm$ is calibrated in voltage to an appropriate scale. The coils A and B can be used to determine the time interval and if this is done directly from the circuits in which the voltages $v$, V are set up, the complete equipment of Fig. 1 becomes an equipment in accordance with the invention for directly effecting multiplication.

If the time interval from which an antilogarithm is to be evaluated, is long, a disadvantage of proceeding as above described is that the final voltage becomes impractically small.

The invention includes developments of this simple scheme which overcome this, and which further enable the decimal point to be indicated independently.

A simple way of increasing the final voltage by a known factor is to decrease the time of discharge of the condenser $Ct$ by a corresponding interval. This may be done by delaying the operation of the switch $Ss$ after the closure of the switch P by a time interval equivalent to the logarithm of the factor, say some power of 10. Any suitable device giving a known delay can be interposed for this purpose between the means for initiating the discharge of the series of condensers C and the means for initiating the discharge of the condenser $Ct$. One possibility is shown by way of example in Fig. 2 where the coil A instead of acting directly upon the switch $Ss$ acts upon a switch $Sd$ which sets in action a delay circuit comprising a capacitance resistance combination $CdRd$ controlling a trigger device $Td$ in the output circuit of which is a coil C which controls the switch $Ss$. The value of the time delay is controlled by the setting of the potentiometers $Pd$ and $pd$ which may for convenience be tapped to give steps corresponding to powers of 10. With this method, if too long a delay, i. e. too high a factor is chosen, this method breaks down and it may therefore involve several successive trials before the answer is obtained.

Alternatively the discharge may be initiated only at the expiry, after a chosen starting instant, of the time interval representing the logarithm of which the antilogarithm is to be obtained, and the value of the voltage measured at the expiry of a chosen time interval after the said chosen starting instant. The measured value will depend on the difference between the two said time intervals and will thus represent the antilogarithm of the reciprocal (or some multiple of the reciprocal) of the time interval. This can be allowed for in setting up the original circuits for obtaining the time intervals to be summed by interchanging the several values of V and $v$.

A part of the circuit operating in this way is shown in Fig. 3. Here the switch $Ss$ which starts the discharge of $Ct$ is controlled by the coil B i. e. it takes place at the end of the sequence of discharges in the circuits in which the values $v$ and V were set up. The coil A which is excited at the commencement of the said sequence of discharges, as in Fig. 2 controls a switch $Sd$ by which a delay circuit $CdRd$ is caused to actuate a trigger device $Td$ at the end of the chosen interval; the winding C in its output circuit actuates the switch $Sf$ which stops the discharge of the capacitance $Ct$.

This method still does not necessarily avoid the final voltage being impracticably low. But by subdividing the chosen time interval determined by circuit $CdRd$ into subdivisions representing, in terms of the exponential change of voltage in the capacitance $Ct$, powers of a convenient factor such as 10, and taking the voltage not at the end of the originally chosen period but at a preceding subdivision the measured value will be some convenient multiple say 10 times or 100 times that of the value it would have at the end of the complete interval. This can be done by adjustment of one or both of the potentiometers $Pd$, $pd$ which may conveniently have tappings for the purpose.

Yet another possibility is to subdivide the complete chosen time interval into aliquot fractional subdivisions representing voltages in ratio of powers of a convenient factor such as 10, and measuring the voltage at that subdivision which next follows the commencement of the discharge. By counting, the number of the subdivision at which the measurement is made will be ascertained and the factor by which the measured value must be multiplied will therefore also be known; if the factor represented by the subdivisions is 10, the measured voltage will always lie between two values which are themselves in the ratio of 10. Thus the measured value gives the significant figures of the answer and the subdivision at which the measurement is made gives the position of the decimal point.

Fig. 4 shows by way of example how this may be done. As in Fig. 3 winding B initiates the discharge of capacitance $Ct$ at the end of the sequence of discharges in the original circuits in which the voltages V and $v$ were set up. The coil A which is excited simultaneously with the commencement of that series of discharges sets in action a device which sends impulses of current through a winding D at intervals corresponding to the subdivisions. This device is exemplified by a cam E driven by a constant speed motor M which closes a contact Ec once per revolution. To ensure that the initiation of the series of discharges synchronises with the impulses produced by the cam E, the switch Pb instead of being in the circuit of windings W and A, starts the motor M, and a second cam is provided which closes a contact Hc in series with the windings W and A at one of the instants when contact Ec closes. Thus the initiation of the series of discharges takes place at the instant of one of the impulses. The cam H is geared down from the motor and is shaped to hold contact Hc closed for at least the chosen complete time interval. Another cam I may also be provided, synchronised with cam H to open a contact Ic in the motor circuit when the cam H reopens the contact Hc, so that switch Pb only has to be closed long enough for the cam H to close contact Hc. Each time the winding D is excited by an impulse sent out by the cam E, it closes a contact Dc which also steps on a counter Di. The contact Dc is in the circuit of another winding F which controls the contact Sf which stops the discharge of the capacitance $Ct$. But normally this circuit is open at another contact Gc so that the closing of contact Dc only results in stepping on of the counter Di. The contact Gc is controlled by a winding G in series with the winding B. Thus the end of the sequence of discharges not only results in the excitation of the winding B and the commencement of discharge of the condenser $Ct$ but it also results in the excitation of the winding G and closing of the contact Gc. At the next impulse through the winding D therefore, the closing of the contact Dc causes the excitation of the winding F which stops the discharge of condenser $Ct$. Accordingly the total time of discharge of condenser $Ct$ is less than one interval between the impulses sent out by E. Where the particular circumstances make it necessary or desirable, the subdivisions of the time interval may be according to other factors than 10, and the subdivisions might be unequal.

In all cases the electrical quantities may be measured by a sampling device which gives the instantaneous value, for example a peak voltmeter which is momentarily connected to the condenser at the appropriate instant, thus avoiding the need for breaking the circuit.

The apparatus above described deals with multiplication. Division can be dealt with by setting up the reciprocals of divisors in such apparatus, but in particular cases it can be done by obtaining the difference between the time intervals representing the logarithms of the qualities in question. This can be done by commencing the discharge of the first of each of the two sets of capacitance simultaneously and determining the time interval (or the corresponding antilogarithm) between the end points of the two sets by arrangements on the lines of Fig. 3. The second set of capacitances and associated elements would then take the place of the delay circuit $CdRd$ and associated elements.

The apparatus of the invention may be further elaborated. For instance two or more complete equipments each yielding a voltage which represents a product of a number of ratios or powers of ratios, can be associated so as to sum (algebraically) these voltages. Thus if a number of similar equipments are associated together the separate products can be summed by mixing the charges, i. e. by connecting the respective condensers $Ct$ in parallel. If the products are to be multiplied by additional constants before summation either these constants can be included as factors in the initial multiplication or they can be provided by making the respective condensers $Ct$ of unequal value together with corresponding adjustments in the discharging resistance.

As general sums of general products are provided as voltages these can, in turn, be subjected to further operations if required. Thus one can obtain products or quotients of polynomials.

The apparatus of the invention is also applicable in some cases to the solution of equations by iterative methods. This may be done by setting up the apparatus (in general a combination of several sets of equipment as described above) to perform operations derived from the equation(s) which would result in a final voltage output of zero when the correct value of the unknown is supplied to the equipment. Then an arbitrary value (conveniently zero or unity) is suplied to the equipment and the final voltage value used to correct the arbitrary value. If the derived operations are suitable functions, repetition of this process is convergent, i. e. by repeating the process a result within any desired tolerance of the correct value can be obtained. The correction may be applied by way of feed back to the first set of equipment in the complete assembly. As is most convenient this feed may either change the voltage applied

What I claim is:

1. Electrical apparatus for use in performing arithmetical operations, comprising a plurality of units each including a circuit incorporating an element in which an electrical quantity varies exponentially with time and each element being maintained at one of two determined values associated with that circuit, means which initiates the exponential change from the one value to the other of the first of the several circuits, substantially instantaneous electric triggering means actuated by the arrival of the first circuit at the second value and when so actuated initiating the change in the second of the several circuits, similar electric triggering means between the second circuits and third circuits and so on to the last two circuits so that the several circuits automatically change from one value to the other in uninterrupted succession, and means which measures the total time interval between an instant having a determined time relationship to the instant of initiation of the first change and an instant having a determined time relationship to the instant of occurrence of the second determined value of the last change, the total time thus being related to the sum of the times of the several exponential changes.

2. Apparatus according to claim 1 in which the time constants of the several units are equal, so that the total time interval is the logarithm of the product of the ratios of the chosen values associated with the several units.

3. Apparatus according to claim 1 in which the time constants of the several units are unequal and are chosen so that the total time interval is the logarithm of the product of predetermined powers of the ratios of the chosen values associated with the several units.

4. Apparatus according to claim 1 in which each exponential element is a capacitance shunted by a resistance so that the varying electrical quantity is voltage across the capacitance.

5. Apparatus according to claim 1 in which each combination of capacitance and resistance is normally connected to an external source of voltage, the initiating means operating by disconnecting the external source at the starting instant of the change of voltage.

6. In an electrical circuit for performing arithmetical operations, the method of operation which comprises the steps of storing a series of charges each proportional to the amplitude of a series of quantities to be multiplied together, dissipating said charges in uninterrupted succession each at a logarithmically varying rate, storing a second charge at a determined voltage, dissipating said second charge logarithmically during a period having an algebraically additive relationship to the time occupied by said succession of charge dissipations, and measuring the voltage of said second charge at the end of the period of dissipation thereby obtaining a value which is a multiple to a known scale of the required product.

7. A method as set forth in claim 6 wherein the algebraically additive relationship is zero so that said period and said time are equal.

8. A method as set forth in claim 6 wherein said period commences after the commencement of said succession by an interval which represents the logarithm of a power of ten.

9. A method as set forth in claim 6 wherein said period commences after the commencement of said succession by an interval which represents the logarithm of that power of ten which will give a final voltage of the second charge not less than one tenth of its original value.

10. A method as set forth in claim 9 wherein the number of intervals each representing the logarithm of ten which expire between the commencement of the said succession and the commencement of the said period is counted thereby obtaining the power of ten by which the final value must be multiplied to give the required product.

11. Apparatus according to claim 1 including a delay circuit which causes the time interval measuring means to start operating a determined time after the initiation of the first change, and means which terminate the operation at the instant the last change reaches its second value.

12. Apparatus according to claim 1 including a delay circuit set in operation at the starting instant of the first change, means actuated at the instant the second value of the last change is reached for setting the time interval measuring means in operation, and means actuated by said delay circuit after a predetermined interval for terminating the operation of the time interval measuring means.

13. Apparatus according to claim 1 including means actuated at the starting instant of the first change for sending out electrical pulses at determined time intervals, means actuated at the instant the second value of the last change is reached for setting the interval measuring means in operation and simultaneously connecting means for terminating the operation of the interval measuring means to the pulse circuit whereby the operation of the interval measuring means is terminated at the next pulse, so that the time interval measured is less than the interval between two pulses.

14. Apparatus according to claim 13 including a counter for counting the pulses set in action at the same instant that the first change is initiated, and means actuated at the instant the operation of said time interval measuring means is terminated for stopping the operation of the counter so that the counter indicates the number of pulses between the instant of starting of the first change and the instant of terminating the operation of said time interval measuring means.

FRANK AUGHTIE.

REFERENCES CITED

The following references are of record in the file of this patent:

UNITED STATES PATENTS

| Number | Name | Date |
|---|---|---|
| 2,062,110 | Swartout | Nov. 24, 1936 |
| 2,313,666 | Peterson | Mar. 9, 1943 |
| 2,401,747 | Dibblee | June 11, 1946 |
| 2,433,254 | Aiken | Dec. 23, 1947 |